United States Patent [19]
Koiwai

[11] Patent Number: 5,523,894
[45] Date of Patent: Jun. 4, 1996

[54] MIRROR HOLDER SUPPORT STRUCTURE FOR AUTOMOBILE REARVIEW MIRROR ASSEMBLY

[75] Inventor: Hideo Koiwai, Saitam, Japan

[73] Assignee: Kabushiki Kaisha Matsuyama Seisakusho, Tokyo, Japan

[21] Appl. No.: 866,211

[22] Filed: Apr. 9, 1992

[30] Foreign Application Priority Data

Apr. 9, 1991 [JP] Japan ................ 3-031779 U

[51] Int. Cl.⁶ ............... G02B 7/182; G02B 1/06
[52] U.S. Cl. ............. 359/841; 359/872; 359/877; 248/477; 248/479; 248/481
[58] Field of Search ................ 359/841, 872, 359/877; 248/476, 477, 479, 481, 548, 549, 900

[56] References Cited

U.S. PATENT DOCUMENTS

| | | | |
|---|---|---|---|
| 4,464,017 | 8/1984 | Wada | 248/549 |
| 4,693,571 | 9/1987 | Kimura et al. | 359/877 |
| 4,696,555 | 9/1987 | Enomoto | 248/900 |
| 4,863,255 | 9/1989 | Seitz | 248/479 |
| 4,877,214 | 10/1989 | Toshiaki et al. | 248/483 |
| 4,915,493 | 4/1990 | Fisher et al. | 359/877 |
| 4,930,370 | 6/1990 | Yoshida | 359/877 |

FOREIGN PATENT DOCUMENTS

| | | | |
|---|---|---|---|
| 871782 | 6/1961 | Japan | 248/900 |
| 60-148739 | 8/1985 | Japan . | |
| 0161231 | 8/1985 | Japan | 359/877 |
| 0148740 | 8/1985 | Japan | 359/877 |
| 0179353 | 9/1985 | Japan | 359/877 |
| 61-32827 | 9/1986 | Japan . | |
| 0057353 | 3/1988 | Japan | 359/877 |
| 1-18434 | 5/1989 | Japan . | |
| 1-30268 | 9/1989 | Japan . | |

*Primary Examiner*—Ricky D. Shafer
*Attorney, Agent, or Firm*—Howard L. Rose

[57] ABSTRACT

A mirror holder support structure for a collapsible rearview mirror assembly on an automobile includes a mirror holder holding a mirror. The mirror holder has a spherical receptacle on a rear surface, with respect to the orientation of the motor vehicle, of the mirror holder. A support assembly which supports the mirror holder has a front casing member and a rear casing member. The support assembly further includes a pivot support having a spherical portion rotatably fitted in the spherical receptacle whereby the mirror holder is swingably supported on the support assembly, the pivot support being integrally formed on a rear surface of the rear casing member. The front and rear casing members are stiffened by a stiffener disposed in a chamber defined between the front and rear casing members. The pivot support and the front casing member are joined to each other by a fastener such as a screw on the axis of the pivot support.

12 Claims, 5 Drawing Sheets

MIRROR HOLDER SUPPORT STRUCTURE FOR AUTOMOBILE REARVIEW MIRROR ASSEMBLY

BACKGROUND OF THE INVENTION

1. Field of the Invention

The present invention relates to a mirror holder support structure which supports the mirror holder of an automobile rearview mirror assembly.

2. Description of the Prior Art

Rearview mirror assemblies for use in automobiles have a mirror holder whose front side, with respect to the orientation of the automobile, is swingably supported on a support mounted on the automobile body. Generally, the support comprises a front member and a rear member that are arranged in front and rear positions, respectively, with respect to the automobile orientation. The rear member is fastened at its edge to the front member by fasteners such as screws. The rear member has a spherical pivot disposed centrally on the rear surface thereof. The mirror holder is swingably supported on the spherical pivot of the rear member.

Since the mirror holder is supported only on the spherical pivot of the rear member, the entire weight of the mirror holder itself and components supported thereon is applied to the spherical pivot. Inasmuch as the spherical pivot is not fixed to the front member, the central region of the rear member tends to suffer flexural vibration while the automobile is running, causing the mirror holder to vibrate undesirably.

SUMMARY OF THE INVENTION

In view of the aforesaid shortcomings of the conventional mirror holder support structure, it is an object of the present invention to provide a mirror holder support structure for an automobile rearview mirror assembly, which structure securely supports a mirror holder against vibration while an automobile having such a mirror holder support structure is running.

According to the present invention, there is provided a mirror holder support structure on a motor vehicle, comprising a mirror holder holding a mirror, the mirror holder having a spherical receptacle on a rear surface, with respect to the orientation of the motor vehicle, of the mirror holder, and a support assembly supporting the receptacle and having a front member and a rear member with respect to the orientation of the motor vehicle. The support assembly further includes a pivot support having a spherical portion rotatably fitted in the spherical receptacle whereby the mirror holder is swingably supported on the support assembly, the pivot support being integrally formed on a rear surface of the rear member, and a fastener by which the pivot support and the front member are joined to each other on an axis of the pivot support.

The front member has a stiffener disposed in a chamber defined between the front and rear members, the stiffener being cylindrical in shape and extending between the front and rear members. Preferably, the stiffener projects integrally from a rear surface of the front member toward a front surface of the rear member. The fastener extends from the pivot support and is coupled to the stiffener, joining the pivot support to the stiffener.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
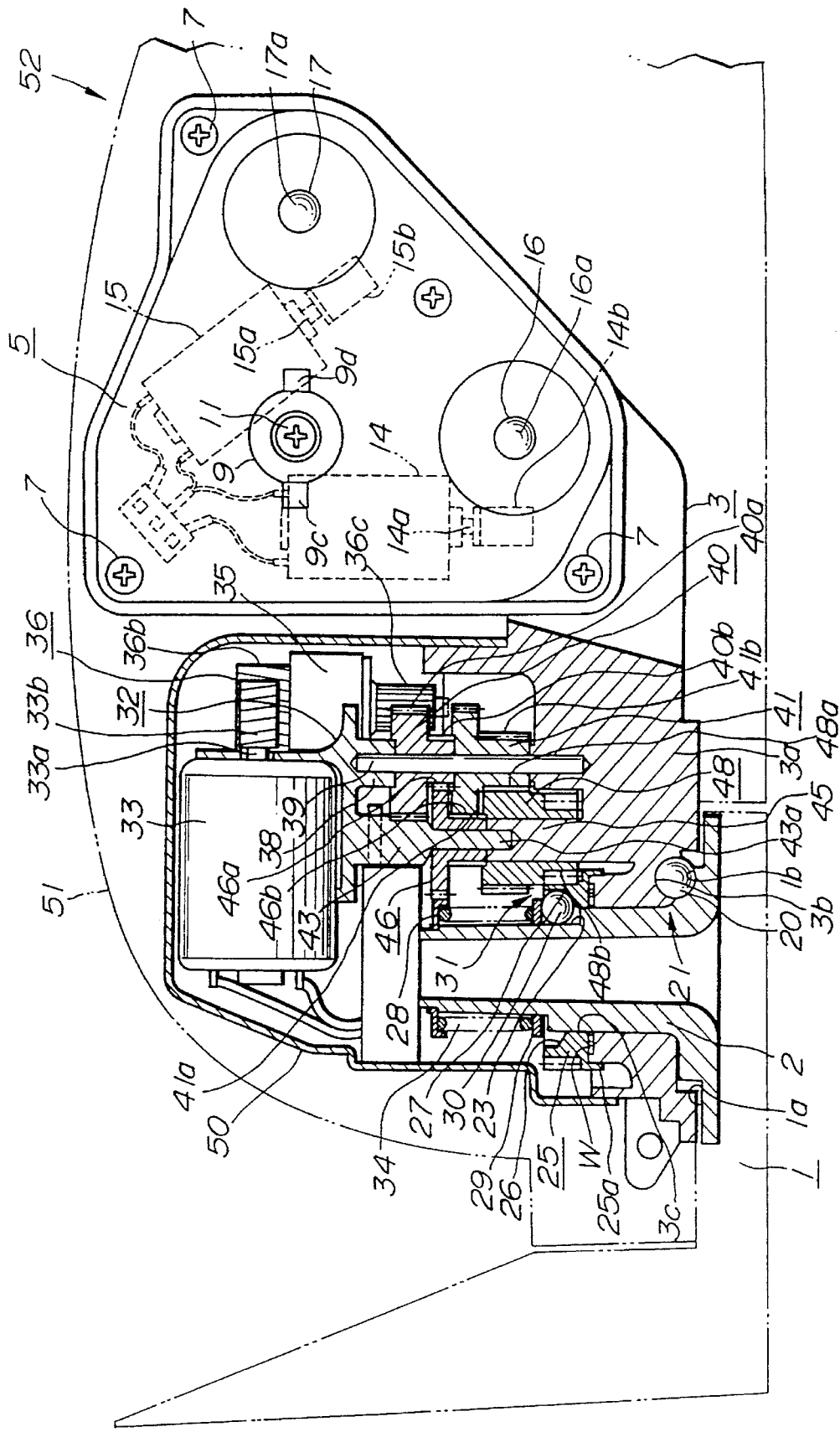
FIG. 1 is a vertical cross-sectional view of a collapsible rearview mirror assembly for use on an automobile door, which incorporates a mirror holder support structure according to the present invention.

FIG. 1 shows a collapsible rearview mirror assembly according to the present invention. As shown in FIG. 1, the collapsible rearview mirror assembly includes a base 1 to be fixedly supported on a motor vehicle body such as an automobile body has a central raised step 1a (see FIG. 3) with a cylindrical fixed shaft 2 integrally mounted thereon. The central raised step 1a has a plurality of radial engaging grooves 1b defined in an upper surface thereof (see also FIG. 3). The central raised step 1a also has a tooth 1c extending radially outwardly from an outer circumferential edge thereof over an upper surface of the base 1, the tooth 1c serving as a mirror assembly stopper for engaging a bracket 3.

Figure 2:
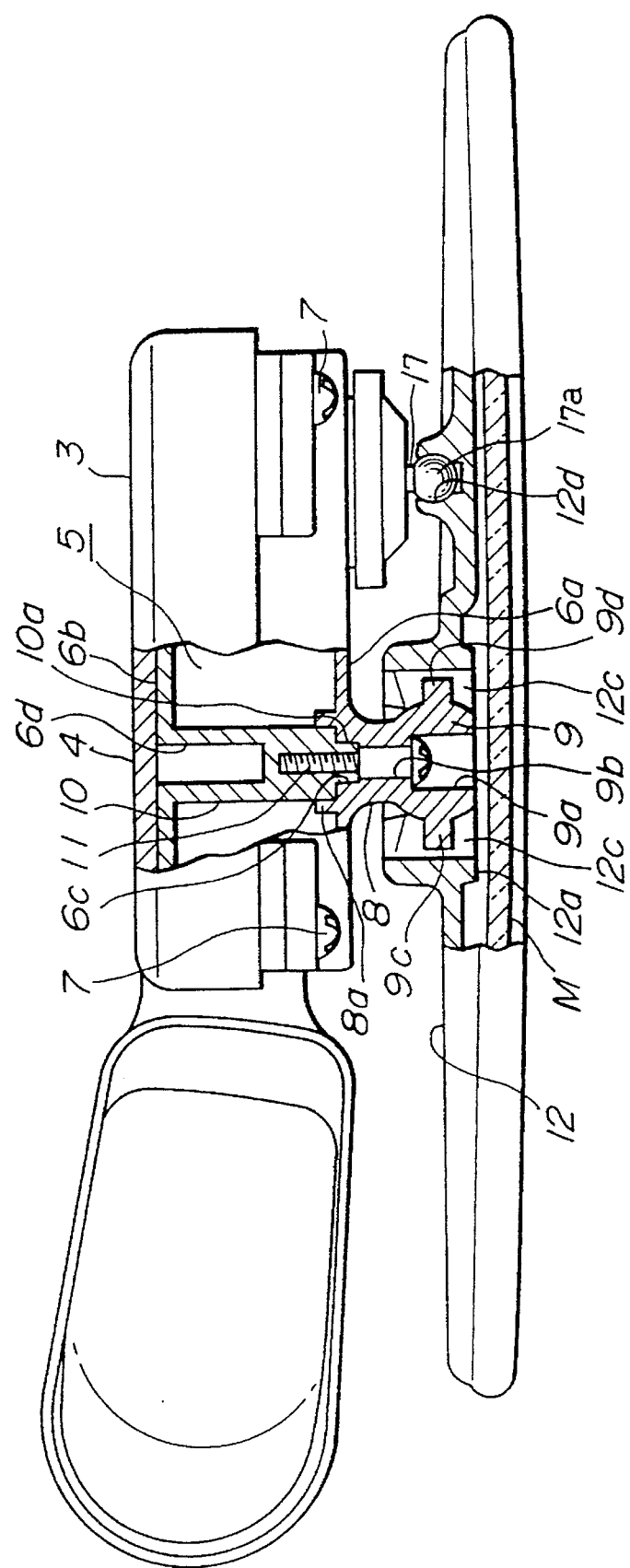
FIG. 2 is a plan view, partly in cross section, of the collapsible rearview mirror assembly, showing a pivot support and associated components.

The bracket 3 has a proximal portion 3a angularly movably fitted over the fixed shaft 2. As shown in FIGS. 1 and 2, a support assembly (described below) and a mirror drive unit 5 disposed therein are fixed to the bracket 3 outwardly of the proximal portion 3a.

The support assembly includes a casing which houses the mirror drive unit 5. As shown in FIG. 2, the casing comprises a rear casing member 6a and a front casing member 6b, both made of synthetic resin. These casing members 6a, 6b are fastened to a support panel 4 of the bracket 3 by screws 7. The mirror drive unit 5 is positioned in a chamber defined between the rear and front casing members 6a, 6b.

The rear casing member 6a has a boss 8 projecting rearwardly integrally from a rear surface thereof. The boss 8 includes a spherical pivot support 9 on its distal end which has a larger-diameter hole 9a and a smaller-diameter hole 9b defined therein and extending therethrough. The front casing member 6b has a substantially cylindrical stiffener 10 projecting rearwardly from a rear surface thereof. The stiffener 10 has a smaller-diameter projection 10a on its distal end which is fitted in a circular recess 6c defined in the rear casing member 6a and opening at a front surface of the rear casing member 6a. The distal end of the stiffener 10 has its circumferential surface fitted in an annular rim 8a that is disposed on the front surface of the rear casing member 6a concentrically with the recess 6c. A threaded fastener 11 such as a screw is inserted from the side of the rear casing member 6a through the holes 9a, 9b and has its threaded shank threaded into the stiffener 10. Alternatively, the threaded fastener 11 may be inserted from the side of the front casing member 6b through a hole 6d in the stiffener 10 threadedly into the boss 8 and the pivot support 9.

Figure 2A:
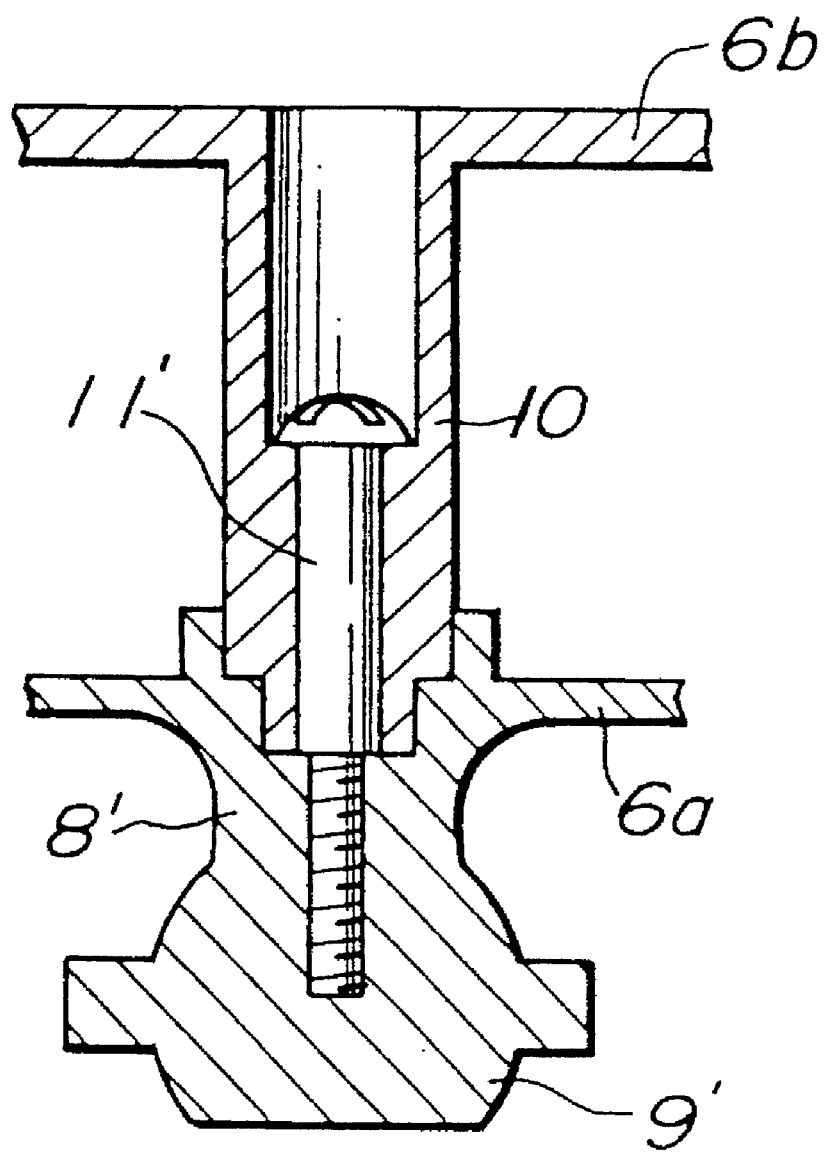
FIG. 2a is a cross-sectional view of a modified pivot support.

FIG. 2a shows a modification in which a threaded fastener 11' is inserted inserted from the side of the front casing member 6b through the hole 6d threaded into a boss 8' and a pivot support 9' which have no larger- and smaller-diameter holes.

Figure 4:
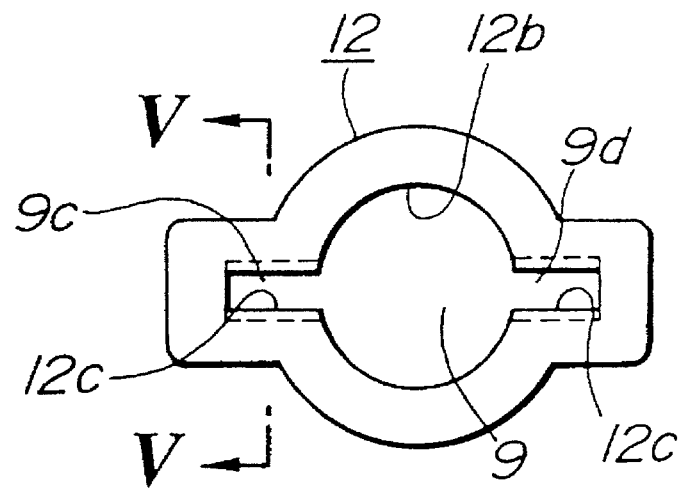
FIG. 4 is a plan view of an engaged portion of a mirror holder of the collapsible rearview mirror assembly.
Figure 5:
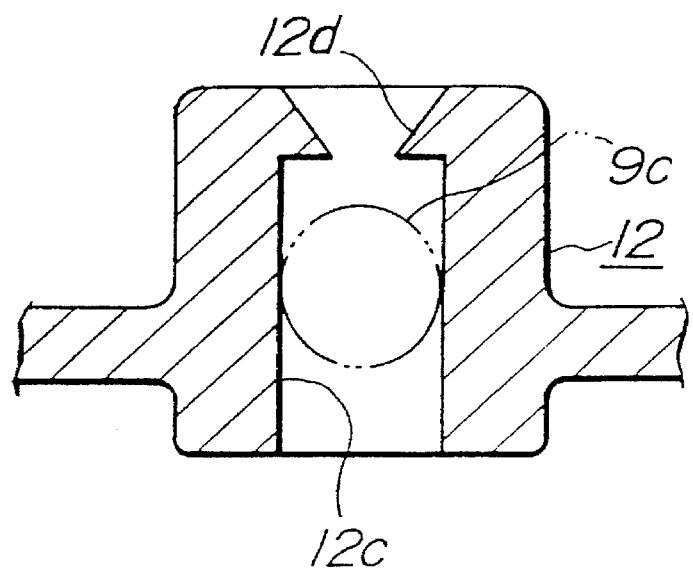
FIG. 5 is a cross-sectional view taken along line V—V of FIG. 4.

A mirror holder 12 with a mirror M held thereby is positioned behind the mirror drive unit 5. The mirror holder 12 is angularly movably supported by the pivot support 9. More specifically, the mirror holder 12 has an engaged portion 12a having a spherical receptacle 12b (see FIG. 4) in which the pivot support 9 is fitted. The receptacle 12b has a pair of diametrically opposite slots 12c of rectangular cross section which are defined therein and open toward each other. The pivot support 9 has a pair of diametrically opposite arms 9c, 9d projecting outwardly and fitted respectively in the slots 12c. As shown in FIG. 5, the mirror holder 12 has a pair of confronting locking teeth 12d disposed in the upper end of each of the slots 12c. The arms 9c, 9d fitted in the respective slots 12c are prevented from being dislodged out of the slots 12c by the locking teeth 12d.

As shown in FIG. 1, the mirror drive unit 5 has a pair of motors 14, 15 disposed in the casing 6. The motors 14, 15 have respective rotatable shafts 14a, 15a with respective worms 14b, 15b fixed thereto. The worms 14b, 15b are held in mesh with respective gears (not shown) that are fixedly mounted on actuating rods 16, 17, respectively. The actuating rods 16, 17 have spherical ends 16a, 17a, respectively, which are fitted in respective receptacles 12d formed on the mirror holder 12. FIG. 2 shows one of the spherical ends, denoted at 17a, which is fitted in the receptacle, denoted at 12d, on the mirror holder 12.

When the motor 14 is energized, the worm 14b and the meshing gear cause the actuating rod 16 to project or retract axially, thereby tilting the mirror holder 12 vertically with respect to the bracket 3. When the motor 15 is energized, the mirror holder 12 is horizontally tilted with respect to the bracket 3.

The proximal portion 3a of the bracket 3 has a plurality of engaging holes 3b (see FIG. 1) defined in a lower surface thereof in alignment with the engaging grooves 1b, respectively. Steel balls 20 are partly fitted in the respective engaging holes 3b, and have portions projecting downwardly into the respective engaging grooves 1b. The engaging grooves 1b and the steel balls 20 jointly serve as a positioning mechanism 21 for positioning the bracket 3 with respect to the base 1.

Figure 3:
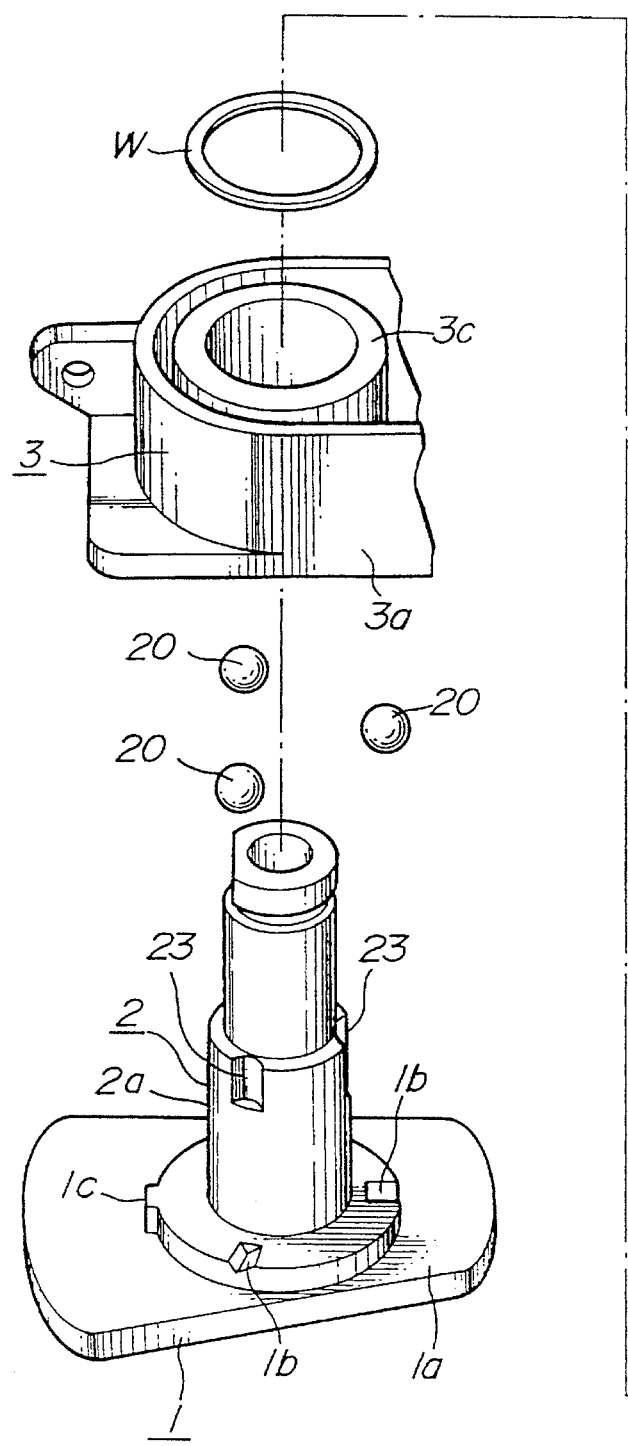
FIG. 3 is a fragmentary exploded perspective view of a collapsing mechanism of the collapsible rearview mirror assembly.
Figure 3:
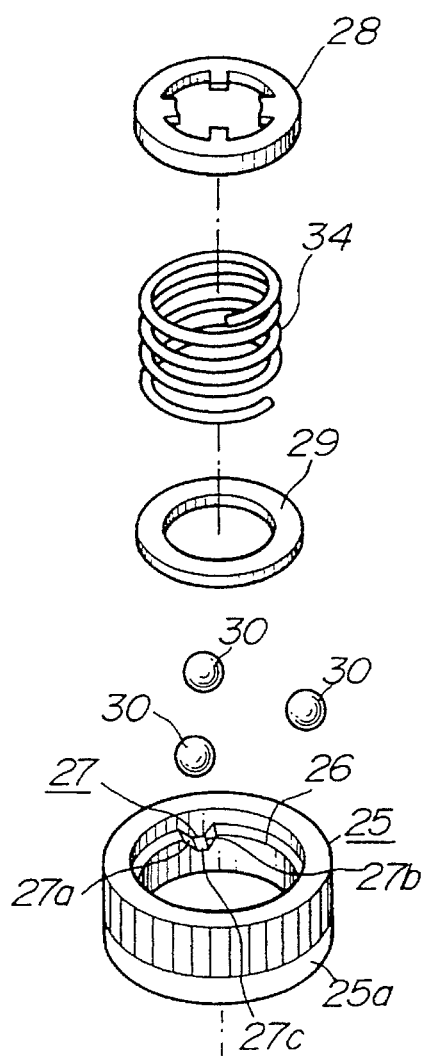

As shown in FIG. 3, the fixed shaft 2 includes a large-diameter portion 2a having a plurality of vertical grooves 23 of semicircular cross section defined in an upper outer circumferential surface thereof at equal circumferential intervals. The grooves 23 have upper ends opening upwardly from the upper edge of the large-diameter portion 2a. A ring gear 25 is rotatably fitted over an upper end portion of the large-diameter portion 2a of the fixed shaft 2 with a washer W interposed between the lower surface of the ring gear 25 and an annular step 3c of the bracket 3. The washer W serves to keep the lower surface of the ring gear 25 spaced a certain distance from the upper surface of the annular step 3c.

The ring gear 25 has a downwardly extending annular wall 25a on a lower outer circumferential edge thereof. The downwardly extending annular wall 25a is rotatably fitted over an upper outer circumferential edge of the annular step 3c. The ring gear 25 also has a slanted annular step 26 on its inner circumferential surface. The annular step 26 has three engaging grooves 27 defined in its slanted surface at equal circumferential intervals. Each of the engaging grooves 27 is defined by two circumferentially opposite surfaces 27a, 27b and a bottom surface 27c extending therebetween.

Steel balls 30 are disposed and engage in the grooves 23 of the fixed shaft 2 and the engaging grooves 27 of the ring gear 25 for thereby keeping the ring gear 25 fixed to the fixed shaft 2. The steel balls 30 and the grooves 23, 27 jointly serve as a mechanism 31 for selectively transmitting and cutting off a drive force.

A spring seat 28 is fixed to the upper end of the fixed shaft 2. Another spring seat 29 is held against the upper ends of the steel balls 30. A spring 34 is disposed under compression between the spring seats 28, 29 for normally urging the steel balls 30 downwardly under a constant resilient force.

A support member 32 is disposed upwardly of the proximal portion 3a of the bracket 3, and supports thereon a motor 33 and an intermediate portion 35 of a vertical rotatable shaft 36. The shaft 36 has a worm wheel 36b on its upper end portion and a gear 36c on its lower end portion. The worm wheel 36b is held in mesh with a worm 33b mounted on a rotatable shaft 33a of the motor 33.

The support member 32 has a downwardly projecting boss 38 on a lower surface thereof, and a first support shaft 39 extends vertically between and is fixed to the boss 38 and the bracket 3. A pair of speed-reduction gears 40, 41 is rotatably supported in tandem on the support shaft 39. The speed-reduction ring gear 40 comprises a larger-diameter gear 40a and a smaller-diameter gear 40b, the larger-diameter gear 40a meshing with the gear 36c. Similarly, the speed-reduction ring gear 41 comprises a larger-diameter gear 41a and a smaller-diameter gear 41b.

The support member 32 also has a vertical second support shaft 43 projecting downwardly and integrally formed with the lower surface thereof near the boss 3. The second support shaft 43 has a small-diameter portion 43a whose distal end is fitted in a vertical third support shaft 45 on the bracket 3. A speed-reduction ring gear 46 is rotatably fitted over the support shaft 43. The speed-reduction ring gear 46 comprises a larger-diameter gear 46a meshing with the gear 40b and a smaller-diameter gear 46b meshing with the gear 41a. A final speed-reduction ring gear 48 is rotatably fitted over the support shaft 45. The speed-reduction ring gear 48 comprises a larger-diameter gear 48a meshing with the gear 41b and a smaller-diameter gear 48b meshing with the ring gear 25.

The motor 33, the speed-reduction gears 40, 41, 46, 48, the fixed shafts 2, and related parts are covered with a cover 50. The cover 50, the mirror holder 12, and the mirror M are covered and protected by a mirror housing 51 which is fixed to the bracket 3.

The bracket 3, the mirror drive unit 5, the mirror holder 12, the mirror M, the motor 33, the speed-reduction gears 40, 41, 46, 48, the mirror housing 51, and related parts jointly constitute a rearview mirror assembly 52 that is tiltable with respect to the fixed shaft 2.

In this embodiment, the threaded fastener or screw 11 extends through the holes 9a, 9b along the common axis of the boss 8 and the pivot support 9. Therefore, the screw 11 doubles as a shaft supporting the boss 8 and the pivot support 9 on which the mirror holder 12 is pivotally supported. The screw 11 is thus effective to stiffen the boss 8 and the pivot support 9. The distal end of the stiffener 10 is fitted in the recess 6c and the rim 8a of the rear casing member 6a which are positioned behind the boss 8. The stiffener 10 also serves to stiffen the boss 8 and the pivot support 9. The rear casing member 6a is fixed to the front casing member 6b through the stiffener 10 on the axis of the boss 8 and the pivot support 9. Consequently, the rear casing member 6a is prevented from flexural vibration, so that the mirror holder 12 is also protected from vibration while the automobile is running.

With the present invention, as described above, since the rear casing member is directly coupled to the front casing member at the pivot support that is disposed on the rear surface of the front casing member, the pivot support is stiffened for thereby supporting the mirror holder with increased rigidity. The rear casing member thus securely joined to the front casing member is therefore effectively prevented from vibration.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

I claim:

1. A mirror holder support structure on a motor vehicle, comprising:

a mirror holder holding a mirror, said mirror holder having a spherical receptacle (12b) on a front surface, with respect to the orientation of the motor vehicle, of the mirror holder; and a support assembly supporting said spherical receptacle and having a front member (6b) and a rear member (6a) with respect to the orientation of the motor vehicle;

said support assembly further including:

a pivot support (9) having a spherical portion rotatably fitted in said spherical receptacle (12b) whereby said mirror holder is swingably supported on said support assembly, said pivot support (9) being integrally formed on a rear surface of said rear member; and a fastener (11) by which said pivot support (9) and said front member (6b) are rigidly joined to each other on an axis of said pivot support;

said front member (6b) having a stiffener (10) projecting integrally from rear surface thereof toward a front surface of said rear member.

2. A mirror holder support structure according to claim 1, wherein said fastener extends from said pivot support and is coupled to said stiffener, joining said pivot support to said stiffener.

3. A mirror holder support structure according to claim 2, wherein said fastener comprises a screw, said pivot support having a through hole defined therein, said screw extending through said through hole.

4. A mirror holder support structure according to claim 1, wherein said fastener extends from said stiffener and is coupled to said pivot support, joining said stiffener to said pivot support.

5. A mirror holder support structure according to claim 1, wherein said support assembly has a chamber defined between said front and rear members, further including a mirror drive unit disposed in said chamber for vertically and horizontally tilting said mirror.

6. A mirror holder support structure according to claim 1, wherein said stiffener is of a cylindrical shape, and has a smaller-diameter projection on a distal end thereof, said rear member having a circular recess defined in the front surface thereof, said smaller-diameter projection being fitted in said recess, said front surface of the rear member having an annular rim disposed thereon concentrically with said recess, said distal end of the stiffener being fitted in said rim.

7. A mirror holder support structure according to claim 1, wherein said rear member is made of synthetic resin.

8. A mirror holder support structure on a motor vehicle, comprising:

a mirror holder holding a mirror, said mirror holder having a spherical receptacle on a front surface, with respect to the orientation of the motor vehicle, of the mirror holder; and a support assembly supporting said spherical receptacle and having a front member and a rear member with respect to the orientation of the motor vehicle;

said support assembly further including:

a pivot support having a spherical portion rotatably fitted in said spherical receptacle whereby said mirror holder is swingably supported on said support assembly, said pivot support being integrally formed on a rear surface of said rear member; and a fastener by which said pivot support and said front member are joined to each other on an axis of said pivot support, said front member having a stiffener projecting integrally from a rear surface thereof toward a front surface of said rear member, said support assembly having a chamber defined between said front and rear members, further including a mirror drive unit disposed in said chamber for vertically and horizontally tilting said mirror.

9. A mirror holder support structure according to claim 8, wherein said fastener extends from said pivot support and is coupled to said stiffener, joining said pivot support to said stiffener, said fastener comprising a screw, said pivot support having a through hole defined therein, said screw extending through said through hole.

10. A mirror holder support structure on a motor vehicle, comprising:

a mirror holder holding a mirror, said mirror holder having a spherical receptacle on a front surface, with respect to the orientation of the motor vehicle, of the mirror holder; and a support assembly supporting said spherical receptacle and having a front member and a rear member with respect to the orientation of the motor vehicle;

said support assembly further including:

a pivot support having a spherical portion rotatably fitted in said spherical receptacle whereby said mirror holder is swingably supported on said support assembly, said pivot support being integrally formed on a rear surface of said rear member; and a fastener by which said pivot support and said front member are joined to each other on an axis of said pivot support, said front member having a stiffener projecting integrally from a rear surface thereof toward a front surface of said rear member, said stiffener being of a cylindrical shape, and having a smaller-diameter projection on a distal end thereof, said rear member having a circular recess defined in the front surface thereof, said smaller diameter projection being fitted in said recess, said front surface of the rear member having an annular rim disposed thereon concentrically with said recess, said distal end of the stiffener being fitted in said rim.

11. A mirror holder support structure on a motor vehicle, comprising:

a mirror holder holding a mirror, said mirror holder having a spherical receptacle (12b) on a front surface, with respect to the orientation of the motor vehicle, of the mirror holder; and a support assembly supporting said spherical receptacle and having a front member (6b) and a rear member (6a) with respect to the orientation of the motor vehicle;

said support assembly further including:

a front wall (4) of the mirror holder support structure having said front member (6b) secured to a rear surface thereof;

a pivot support (9) having a spherical portion rotatably fitted in said spherical receptacle (12b) whereby said mirror holder is swingably supported on said support assembly, said pivot support (9) being integrally formed on a rear surface of said rear member; and a fastener (11) by which said pivot support (9) and said front member (6b) are rigidly joined to each other on an axis of said pivot support.

12. A mirror holder support structure according to claim 11, wherein said front member has a stiffener projecting integrally from a rear surface thereof toward a front surface of said rear member.

* * * * *